April 13, 1937.　　A. C. DURDIN, 3D　　2,076,529
SEWAGE TREATMENT APPARATUS
Filed Dec. 18, 1935　　2 Sheets-Sheet 1
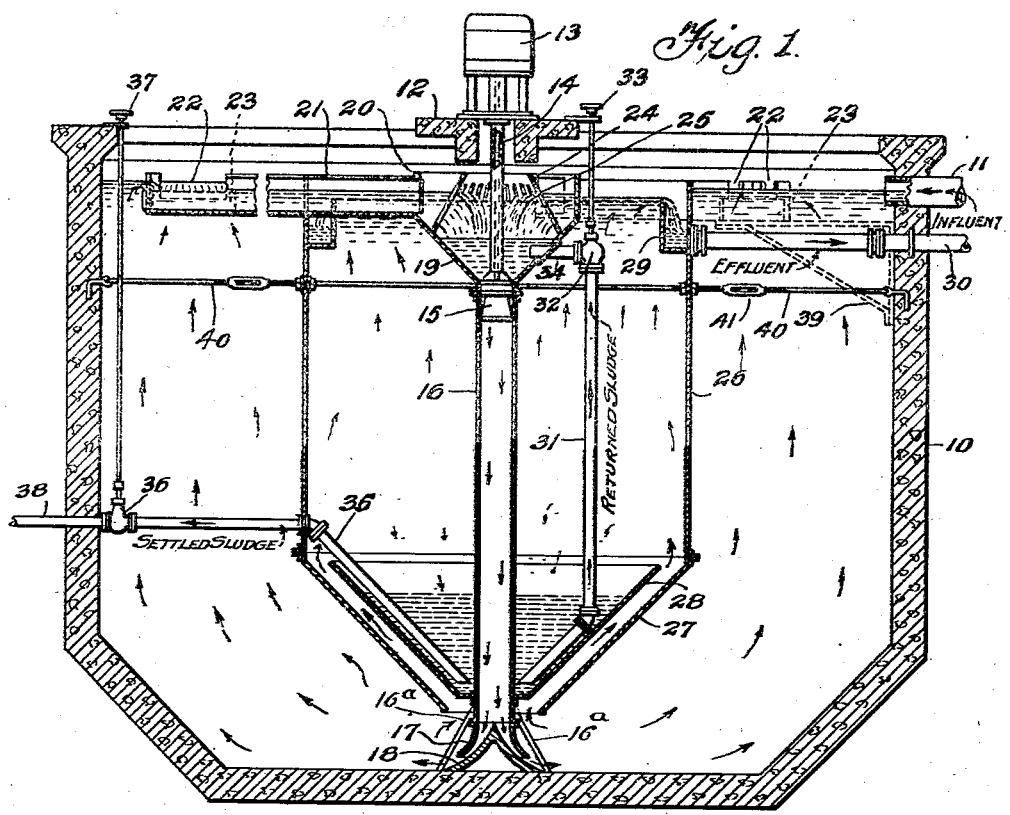
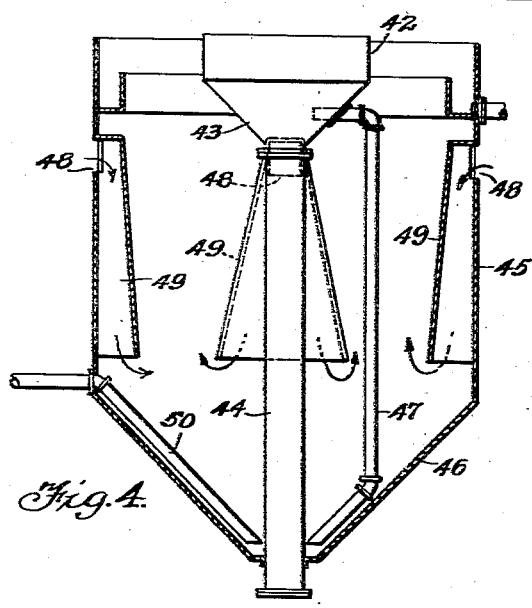
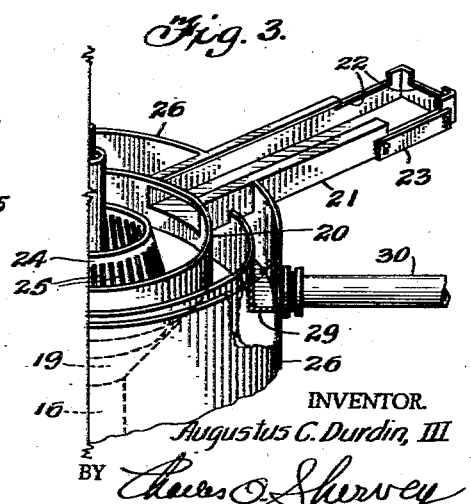
INVENTOR.
Augustus C. Durdin, III
BY Charles O. Shervey
ATTORNEY.

April 13, 1937.  A. C. DURDIN, 3D  2,076,529
SEWAGE TREATMENT APPARATUS
Filed Dec. 18, 1935   2 Sheets-Sheet 2

INVENTOR.
Augustus C. Durdin, III,
BY Charles O. Shervey
ATTORNEY.

Patented Apr. 13, 1937

2,076,529

UNITED STATES PATENT OFFICE 2,076,529

SEWAGE TREATMENT APPARATUS

Augustus C. Durdin, III, Niles Center, Ill., assignor to Chicago Pump Company, Chicago, Ill., a corporation of Illinois Application December 18, 1935, Serial No. 55,109

9 Claims. (Cl. 210—8)

This invention relates to sewage treatment apparatus of the type which employs the activated sewage process, and more particularly it relates to a mechanical aerator type of apparatus in which the liquor is forced through a draft tube and recirculated with the liquor in the aerating tank.

One object of this invention is to provide a settling chamber within the aerating tank into which liquor may flow from the tank and wherein the sludge may settle down and be returned to the aerated liquor (without the aid of a pump or other mechanical propeller) and then recirculated through the aerating tank.

Another object is to provide an arrangement of parts in the down draft mechanical aerator type of sewage treatment apparatus, in which a differential pressure head or water level is utilized to lift the sludge from the settling chamber to the aerator, whereby it may be recirculated.

Other objects and advantages will appear in the course of the following specification, and with all of said objects and advantages in view, this invention consists in the several novel features, hereinafter fully set forth and claimed.

The invention is clearly illustrated in the drawings accompanying this specification, in which:

Fig. 1 is a vertical, cross-section of a sewage treatment apparatus, taken on the line 1—1 of Fig. 2, and illustrating the preferred embodiment of the invention;

Fig. 3 is a fragmental, perspective view of the aerator, settling tank and associated parts;

Fig. 4 is a vertical, cross-section, illustrating a slight modification of the invention.

Figure 2:
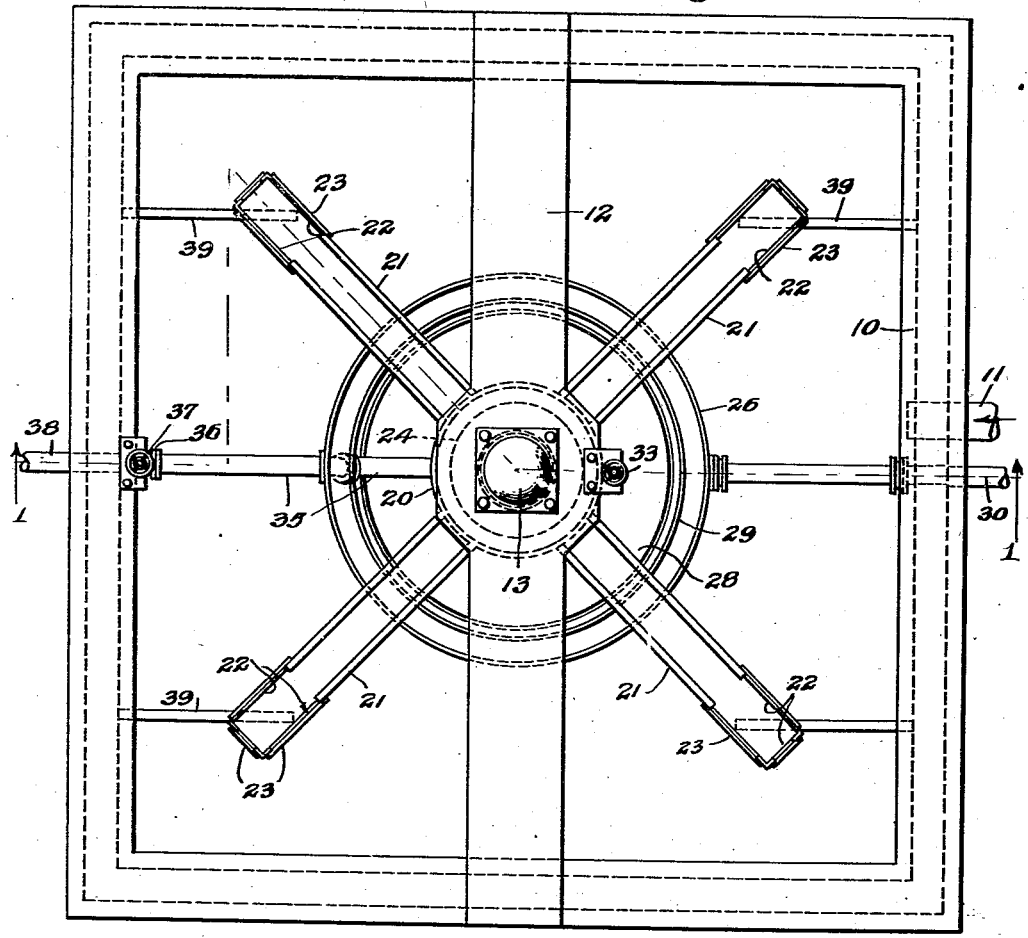
Fig. 2 is a plan thereof.

Referring to said drawings, and first to Figs. 1 to 3 inclusive, the reference character 10 designates an aerating tank of square, round or of any other desirable shape, having sloping or inclined walls running from the side walls to the bottom thereof.

An influent conduit 11, discharges the sewage or other industrial waste to be treated into the tank adjacent its top, and an effluent conduit 30 conducts the treated sewage away from the apparatus.

Mounted upon a platform or walkway, extending across the top of the tank, is a motor 13, which is connected to and drives a circulating pump or other liquid impeller or propelling device 15 located somewhat below the level of the contents of the tank. A shaft 14, contained in a suitable hanger pipe, connects the motor with the pump.

Surrounding the pump and extending down therefrom almost to the bottom of the tank is a draft tube 16 which directs the sewage and activated sludge to the bottom of the tank. On the lower end of the draft tube is a diffusing cone 17, below which is a spreader cone 18, which co-acts with the diffusing cone to diffuse the liquor outwardly into the contents of the tank. The down draft tube may be supported by legs 16ᵃ resting on the bottom of the tank, and its upper end is braced by tie rods 40 that extend to the walls of the tank.

At the top of the draft tube is an aerator, in which the liquor is contacted with air so as to supply it with oxygen to support the bacterial life. The aerator may assume many forms and the one herein illustrated will now be described.

Secured to and extending up from the top of the down draft tube is a mixing hopper 19, the wall of which is continued upward to provide a collection chamber 20 from which a plurality of troughs 21 run towards the corner of the tank. At their outer ends the troughs are provided with weirs 22 over which the contents of the tank flow into the troughs. Vertically adjustable weirs 23 are usually provided in connection with the weirs 22 to regulate the flow into the troughs. The troughs are supported at their outer ends by brackets 39 anchored in the walls of the tank.

Supported in the mixing hopper 19, is a hollow cone 24, formed in its wall with a multiplicity of elongated slots 25, through which the liquor spills into the mixing hopper. The circulating pump 15 maintains a lower water level in the mixing hopper than that in the tank. As a result, the liquor spilling through the slotted cone entrains air for supplying oxygen to the bacteria. The pump 15 forces the liquor and entrained air down the draft tube and discharges it at the bottom of the tank, from which it rises and part of it reenters the troughs and is recirculated and part of it enters a settling chamber, as will be presently explained.

To permit the sludge to settle out of the liquor, a quiescent zone in the form of a settling chamber is provided in the tank, into which part of the liquor flows from the tank, and rises to the top of the settling chamber and discharges therefrom through the effluent conduit 30, whereas the sludge settles down to the bottom of the settling chamber.

The settling chamber is formed by an enclosing wall 26, which surrounds the down draft tube and extends above the level of the liquor in the main portion of the tank so as to prevent the liquor from entering the settling chamber at its top. The bottom of the settling chamber desirably is formed by a hopper-like portion, and surrounded by an outer hopper-like wall 27 which forms a continuation of the wall 26. The apex portion of the outer bottom wall 27 is open and provides an inlet to the passage between the two walls 27, 28. The outlet from the passage to the settling chamber is located at the upper end of the passage.

The walls 27, 28 provide a relatively long passage through which the liquor may pass slowly to the settling chamber, whereby the turbulent condition of the liquor adjacent the entrance to the settling chamber may subside before the liquor enters the settling chamber.

Adjacent the top of the settling chamber is a gutter or trough 29, desirably disposed along the inner face of the wall 26, into which the effluent flows from the settling chamber and from which it discharges through the effluent conduit 30.

In the quiescent zone in the settling chamber, the liquor rises slowly and the sludge settles down therefrom and collects on the bottom of the chamber.

To return sludge to the aerator without the aid of a pump or other mechanical means for raising it to the aerating means of the apparatus, a sludge return pipe 31 is provided which leads upward from the lower end of the hopper-like bottom 28 of the settling chamber to a point below the level of the liquor in the main portion of the tank, where it is provided with a nozzle 34 that enters some element of the aerating means or recirculating means. The sludge return pipe is here shown as discharging into the interior of the mixing hopper, and desirably below the level of the liquor therein as maintained by the pump 15. A control valve 32 may be interposed in the sludge return pipe 31, for regulating the flow of sludge into the mixing hopper. The valve may be manipulated by a hand wheel 33 located at the platform or walkway 12. More or less sludge may be supplied to the aerated liquor in the mixing hopper, as required, by manipulating the valve 32.

Because of the higher pressure head in the main portion of the tank than in the mixing hopper at the discharge end of the sludge return pipe, the sludge discharges into the mixing chamber by gravity, and without the aid of a pump or other lifting means.

A sludge discharge pipe 35 may be provided for drawing off excess sludge that may accumulate on the bottom of the settling chamber. The pipe 35 leads from the lower end of the settling chamber and extends out through the wall of the tank, as at 38, from which it may lead to a digestion tank, drying bed or wherever desired. Desirably a valve 36, controlled by a hand wheel 37 at the top of the tank, provides means for controlling or entirely shutting off the flow through the sludge discharge pipe.

In the modified form of the invention, illustrated in Fig. 4, a slightly modified form of elongated passage between the main tank and settling chamber is illustrated. The reference characters 42, 43, designate elements of the aerator; 48 the pump, or impeller, and 44 the tube through which the liquor is recirculated. The enclosing wall 45 of the settling chamber has a hopper-like bottom 46 which is closed at its apex end. In this form of aerating and recirculating elements, the liquor may be moved upward or downward through the tube and may be discharged at the top or the bottom thereof.

The inlet to the settling chamber in this modified form of the invention is shown in the form of inlet openings 48, formed in the side wall of the settling chamber and located adjacent the upper end of the same. Elongated inlet passages extending from said inlet openings down towards the lower end of the chamber are provided by walls 49, the upper ends of which close the passageway above the inlet openings.

In this form of the invention, liquor enters the lower end of the settling chamber through the elongated passages and slowly rises in the settling chamber, allowing the sludge to settle to the bottom thereof. The sludge return pipe, corresponding to the pipe 31 of the preferred form, is illustrated at 47, and the sludge draw-off pipe at 50. In other respects the apparatus is substantially the same as that of the preferred form. In this form also the sludge is returned to the aerator due to the differential pressure head in the tank and aerator.

Figure 5:
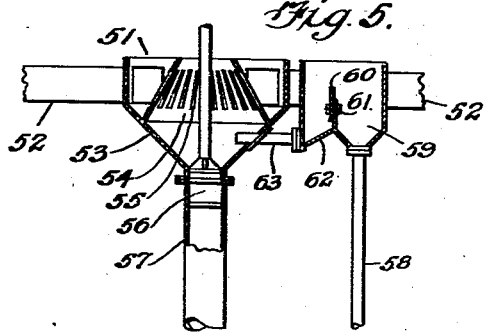
Fig. 5 is a fragmental, vertical section, illustrating a second modification.

In the modified form illustrated in Fig. 5, the sludge return pipe 58 is provided with means whereby the amount of sludge which is being returned to the aerator can be visually observed, and the rate of flow thereof can be regulated. In this form, the upper end of the sludge return pipe 58 is connected to a hopper 59, across which extends a vertically adjustable weir 60, which is fastened to a cross wall 61 by bolts and nuts, or otherwise. So long as the upper edge of the weir 60 is maintained below the level of the liquor in the tank, sludge will be forced up the sludge return pipe 58 and will flow over the weir. The volume of sludge passing over the weir can be regulated by raising or lowering the latter.

To shut off the flow of sludge, the adjustable weir 60 is raised above the level of the liquor in the tank. The nozzle 63, leads from the overflow side 62 of the hopper 59 and delivers the sludge to the collection hopper 53, as in the preferred form of the invention. In this form of the invention, the collection hopper 51, troughs 52, mixing hopper 53, cone 54, slots 55, pump 56 and down draft tube 57, are substantially similar to the corresponding parts of the preferred form.

From the above, it is apparent that sludge which settles in a settling chamber of sewage treatment apparatus may be returned to the aerating means, or to the conduit for the flow of liquor thereto or therefrom, without the aid of mechanical lifting means. This results in a great saving in the cost of the original installation and in the cost of operation.

Furthermore, the sludge return pipe may be employed in connection with a draft tube through which liquor is circulated downwardly or upwardly, so long as a differential pressure head is maintained between the contents of the aerating tank and the aerating means or draft tube. The draft tube and mixing hopper, in the several forms of the invention illustrated, provide a conduit through which the liquor is forced from one level to another to effect recirculation in the tank.

While the invention has been shown and described in connection with sewage treatment apparatus, it is to be understood that its use is not limited thereto as it is applicable to other apparatus for the treatment of liquids.

I claim as new and desire to secure by Letters Patent:

1. The combination of an aerating tank, a settling chamber therein in which sludge settles, said settling chamber having an inlet leading from the tank, and an effluent conduit leading from its upper end, aerating means in said tank, including an impeller, a conduit through which the impeller circulates the contents of the tank from one part thereof to another, said impeller serving to lower the pressure head in said conduit below that in the tank, and a sludge return pipe unprovided with any sludge lifting means, and having an inlet at the bottom of the settling chamber and an outlet located below the level of the contents of the tank and discharging into the lower pressure area of the conduit through which the recirculated stream flows, the higher pressure head in the tank serving to lift the sludge in the sludge return pipe and discharge it into said conduit.

2. The combination of an aerating tank, a settling chamber therein, having an inlet leading from the tank and an effluent conduit leading from its upper end, an open ended down draft tube, aerating means located at and below the level of the liquor in said tank, said aerating means including liquid propelling means located in the down draft tube and arranged to propel aerated liquor downwardly through said down draft tube, whereby a lower liquid level is maintained in the aerating means than in the main part of the tank, and a sludge return pipe having an inlet at the bottom of the settling chamber and an outlet below the level of the contents of the tank and discharging into the aerated liquor flowing into the draft tube.

3. The combination of an aerating tank, a settling chamber therein, having an inlet leading from the tank and an effluent conduit leading from its upper end, an open ended down draft tube, aerating means located at and below the level of the liquor in said tank, said aerating means including a hopper and liquid propelling means arranged to propel liquor downwardly through said down draft tube, whereby a lower liquid level is maintained in the hopper than in the main part of the tank, and a sludge return pipe having an inlet at the bottom of the settling chamber, and an outlet below the level of the contents of the tank and discharging into the hopper, said sludge return pipe being unprovided with any sludge lifting means.

4. In sewage treatment apparatus, the combination of an aerating tank, an upright conduit therein, aerating means, including a propelling element for forcing the contents of the tank down through the conduit and back into the contents of the tank, said propelling element serving to maintain a lower liquid level in the conduit than in the tank, a settling chamber in the tank providing a quiescent zone in which the liquid contents rise and sludge settles down, said settling chamber having an inlet, opening from the tank, an effluent conduit at the top of said settling chamber through which the effluent discharges, and a sludge return pipe, unprovided with any sludge lifting means, leading upward from the bottom of said settling chamber to a place below the level of the contents of the main portion of the tank and having an outlet, discharging into the conduit at a point below the level of the liquor which is maintained therein by the propelling element.

5. In sewage treatment apparatus, the combination of an aerating tank, an upright down draft tube therein, aerating means, including a mixing hopper and a propelling element for forcing the contents of the tank down through the tube and back into the contents of the tank, said propelling element serving to maintain a lower liquid level in the hopper than in the tank, a settling chamber in the tank providing a quiescent zone in which the liquid contents rise and sludge settles down, said settling chamber having an inlet, opening from the tank, an effluent conduit at the top of said settling chamber through which the effluent discharges, and a sludge return pipe unprovided with any sludge lifting means, leading upward from the bottom of said settling chamber to a place below the level of the contents of the main portion of the tank and having an outlet, discharging into the mixing hopper of the aerating means.

6. In sewage treatment apparatus, the combination of an aerating tank, a down draft tube therein, a mixing hopper at the top thereof, a collection chamber thereabove into which the contents of the tank flows by gravity, a slotted hollow cone through which the liquor spills into the mixing hopper, impelling means in said tube for discharging the liquor downwardly through said tube, whereby a lower pressure head is maintained in the mixing hopper than in the main part of the tank, a settling chamber in the tank providing a quiescent zone in which sludge settles and the liquid rises, said settling chamber having an inlet, opening from the tank and an effluent conduit at its top, and a sludge return pipe having an inlet adjacent the bottom of the settling chamber and a discharge outlet entering the mixing hopper.

7. The combination of an aerating tank, a settling chamber therein in which sludge settles, said settling chamber having an inlet leading from the tank, and an effluent conduit leading from its upper end, aerating means in said tank, including a mixing hopper and an impeller, a draft tube through which the impeller circulates the contents of the tank from one part thereof to another, said impeller serving to lower the liquid level in said mixing hopper below that in the tank, and a valve controlled sludge return pipe unprovided with any sludge lifting means, having an inlet at the bottom of the settling chamber and an outlet located below the level of the contents of the tank and discharging into the recirculated stream flowing through the mixing hopper, the higher pressure head in the tank serving solely to lift the sludge in the sludge return pipe.

8. The combination of an aerating tank, a settling chamber therein in which sludge settles, said settling chamber having an upright inlet passage leading from the upper part of the tank and discharging into the lower part of the settling chamber, and an effluent conduit leading from its upper end, aerating means in said tank, including an impeller, a conduit through which the impeller circulates the contents of the tank from one part thereof to another, said impeller serving to lower the liquid level in said conduit below that in the tank, and a valve controlled sludge return pipe unprovided with any sludge lifting means and having an inlet at the bottom of the settling chamber and an outlet located below the level of the contents of the tank and discharging into the recirculated stream flowing through the conduit, the higher pressure head in the tank serving solely to lift the sludge in the sludge return pipe.

9. The combination of an aerating tank, a settling chamber therein in which sludge settles, said settling chamber having an inlet leading from the tank, and an effluent conduit leading from its upper end, aerating means in said tank, including an impeller, a conduit through which the impeller circulates the contents of the tank from one part thereof to another, said impeller serving to lower the liquid level in said conduit below that in the tank, and a sludge return pipe unprovided with any sludge lifting means and having an inlet at the bottom of the settling chamber and an outlet located below the level of the contents of the tank and discharging into the recirculated stream flowing through the conduit, there being an inspection chamber interposed in said sludge return pipe through which the flowing sludge is visible, the higher pressure head in the tank serving solely to lift the sludge in the sludge return pipe.

AUGUSTUS C. DURDIN, III.